United States Patent
Cotugno et al.

(10) Patent No.: US 8,748,663 B2
(45) Date of Patent: Jun. 10, 2014

(54) CURING ACTIVATORS

(75) Inventors: Salvatore Cotugno, Rome (IT); Paolo Straffi, Rome (IT); Barbara Secchi, Rome (IT)

(73) Assignee: Bridgestone Corporation, Tokyo (JP)

( * ) Notice: Subject to any disclaimer, the term of this patent is extended or adjusted under 35 U.S.C. 154(b) by 123 days.

(21) Appl. No.: 13/500,874

(22) PCT Filed: Oct. 7, 2010

(86) PCT No.: PCT/IB2010/002546
§ 371 (c)(1),
(2), (4) Date: Jun. 19, 2012

(87) PCT Pub. No.: WO2011/042799
PCT Pub. Date: Apr. 14, 2011

(65) Prior Publication Data
US 2012/0259140 A1     Oct. 11, 2012

(30) Foreign Application Priority Data
Oct. 7, 2009   (IT) .............................. TO2009A0765

(51) Int. Cl.
*C07C 211/63*     (2006.01)
*C08K 5/19*       (2006.01)

(52) U.S. Cl.
USPC ........................... 564/291; 564/295; 564/296

(58) Field of Classification Search
None
See application file for complete search history.

(56) References Cited

U.S. PATENT DOCUMENTS

| | | |
|---|---|---|
| 3,780,092 A | 12/1973 | Samour et al. |
| 4,960,821 A | 10/1990 | Peiffer |
| 5,187,239 A | 2/1993 | Parks et al. |

FOREIGN PATENT DOCUMENTS

| | | |
|---|---|---|
| EP | 0 376 876 A1 | 7/1990 |
| GB | 1 298 099 A | 11/1972 |
| WO | 2004/052983 A1 | 6/2004 |
| WO | 2010/049470 A1 | 5/2010 |

OTHER PUBLICATIONS

International Search Report of PCT/IB2010/002546, dated Jan. 12, 2011.

*Primary Examiner* — Brian J Davis
(74) *Attorney, Agent, or Firm* — Sughrue Mion, PLLC

(57) ABSTRACT

Use of compounds of molecular formula (I) as curing activators of mixes having a cross-linkable unsaturated-chain polymer base: $([R_1R_2R_3NR_5(NR_4R_6R_7)n]^{(n+1)+})y(n+1)X^{y-}$ (I); where: X is an anionic atom or group; $R_1$, $R_2$ and $R_3$, which may be the same or different, are each $C_mH_{2m+1}$, where m ranges between 1 and 3, or $CH_2CHCH_2$ or $CHCHCH_3$; $R_4$, $R_6$ and $R_7$, which may be the same or different, are each $CH_2CHCH_2$ or $CHCHCH_3$; n is 0 or 1; y is 1 when n is 1; y is 1 or 2 when n is 0; $R_5$ is an aliphatic group $C_{15}$-$C_{22}$ when n is 0; and is an aliphatic group $C_8$-$C_{16}$ when n is 1; when n is 0, at least one of $R_1$, $R_2$, $R_3$ and $R_5$ comprises a double bond.

7 Claims, No Drawings

CURING ACTIVATORS

CROSS REFERENCE TO RELATED APPLICATIONS

This application is a National Stage of International Application No. PCT/IB2010/002546 filed Oct. 7, 2010, claiming priority based on Italian Patent Application No. TO2009A000765 filed Oct. 7, 2009, the contents of all of which are incorporated herein by reference in their entirety.

TECHNICAL FIELD

The present invention relates to curing activators.

BACKGROUND ART

To achieve specific results, curing a rubber mix calls for special additives, including curing activators and accelerating agents.

In some industrial applications requiring fast curing, highly effective, booster accelerating agents are used.

Some of these have recently come under attack for health reasons.

Fatty acids are also commonly used as curing activators, but, though effective in activating the curing process, may result in a reduction in adhesion of the green mix. Fatty acids, in fact, by reacting with zinc oxide, may produce, as an undesired by-product, zinc salts which tend to migrate towards the surface of the mix, thus reducing adhesion of the green mix.

A need is therefore felt for new curing activator systems designed to ensure fast curing, while at the same time limiting use of fatty acids.

DISCLOSURE OF INVENTION

The present invention relates to use of compounds of molecular formula (I) as curing activators of mixes comprising a cross-linkable unsaturated-chain polymer base;

$$([R_1R_2R_3NR_5(NR_4R_6R_7)_n]^{(n+1)+})y(n+1)X^{y-} \quad (I)$$

where:

X is an anionic atom or group $R_1$, $R_2$ and $R_3$, which may be the same or different, are each $C_mH_{2m+1}$, where m ranges between 1 and 3, or $CH_2CHCH_2$ or $CHCHCH_3$ $R_4$, $R_6$ and $R_7$, which may be the same or different, are each $CH_2CHCH_2$ or $CHCHCH_3$ n is 0 or 1 y is 1 when n is 1; y is 1 or 2 when n is 0

$R_5$ is an aliphatic group $C_{15}$-$C_{22}$ when n is 0; and is an aliphatic group $C_8$-$C_{16}$ when n is 1 when n is 0, at least one of $R_1$, $R_2$, $R_3$ and $R_5$ comprises a double bond.

$R_1$, $R_2$ and $R_3$ are preferably $CH_2CHCH_2$, and, more preferably, n is 1 and $R_5$ is a saturated aliphatic group.

Preferably, $R_5$ comprises a double bond, and n is 0.

The curing activator preferably has a molecular formula in the group comprising:

$[(CH_3)_3N(CH_2)_8CHCH(CH_2)_7CH_3]^+X^-$;

$[(CH_2CHCH_2)_3N(CH_2)_{15}CH_3]^+X^-$;

$[(CH_3)(CH_2CHCH_2)_2N(CH_2)_{15}CH_3]^+X^-$;

$[(CH_2CHCH_2)(CH_3)_2N(CH_2)_{15}CH_3]^+X^-$; e $[(CH_2CHCH_2)_3N(CH_2)_{12}N(CH_2CHCH_2)_3]_2^+2X^-$.

Preferably, $X^-$ is $I^-$ or $Br^-$.

Preferably, 0.01 to 10 phr of the curing activator is used in the mix.

The present invention also relates to a mix comprising a cross-linkable unsaturated-chain polymer base, characterized by comprising a compound of molecular formula (I) as a curing activator.

The present invention also relates to a rubber product, characterized by being made from a mix comprising a compound of molecular formula (I) as a curing activator.

The present invention also relates to a tyre, characterized by comprising at least one rubber part made from a mix comprising a compound of molecular formula (I) as a curing activator.

BEST MODE FOR CARRYING OUT THE INVENTION

The following are purely non-limiting examples for a clearer understanding of the invention.

Examples

In the examples below, five different compounds (a, b, c, d, e) in the class of curing aids according to the present invention were employed.

The five curing activators were as follows:

compound (a) of molecular formula $[(CH_3)_3N(CH_2)_8CHCH(CH_2)_7CH_3]^+I^-$ compound (b) of molecular formula $[(CH_2CHCH_2)_3N(CH_2)_{15}CH_3]^+Br^-$ compound (c) of molecular formula $[(CH_3)(CH_2CHCH_2)_2N(CH_2)_{15}CH_3]^+I^-$ compound (d) of molecular formula $[(CH_2CHCH_2)(CH_3)_2N(CH_2)_{15}CH_3]^+I^-$ compound (e) of molecular formula $[(CH_2CHCH_2)_3N(CH_2)_{12}N(CH_2CHCH_2)_3]_2^+2Br^-$ Purely by way of example, the above curing activators were tested using TBBS and DPG accelerating agents as described below.

TBBS Mixes

Ten mixes ($A_1$, $A_2$, $B_1$, $B_2$, $C_1$, $C_2$, $D_1$, $D_2$, $E_1$, $E_2$) were prepared, each comprising one of the above five curing activators (a, b, c, d, e) according to the present invention. More specifically, the five different curing activators (a, b, c, d, e) were used in two different concentrations.

Table I shows the compositions in phr of the above mixes.

TABLE I

|  | $A_1$ | $A_2$ | $B_1$ | $B_2$ | $C_1$ | $C_2$ | $D_1$ | $D_2$ | $E_1$ | $E_2$ |
|---|---|---|---|---|---|---|---|---|---|---|
| S-SER |  |  |  |  | 100 |  |  |  |  |  |
| N660 |  |  |  |  | 40 |  |  |  |  |  |
| ZnO |  |  |  |  | 2 |  |  |  |  |  |
| S |  |  |  |  | 2 |  |  |  |  |  |
| TBBS |  |  |  |  | 2 |  |  |  |  |  |
| comp. (a) | 2 | 5 |  |  |  |  |  |  |  |  |
| comp. (b) |  |  | 2 | 5 |  |  |  |  |  |  |
| comp. (c) |  |  |  |  | 2 | 5 |  |  |  |  |
| comp. (d) |  |  |  |  |  |  | 2 | 5 |  |  |
| comp. (e) |  |  |  |  |  |  |  |  | 2 | 5 |

To accurately assess the advantages of mixes comprising the curing activators according to the present invention, a control mix ($MC_{TBBS}$) was prepared comprising fatty acids as activators, as opposed to the curing activators of the mixes in Table I.

Table II shows the composition in phr of the control mix.

TABLE II

| | $MC_{TBBS}$ |
|---|---|
| S-SBR | 100 |
| N660 | 40 |
| FATTY ACIDS | 1 |
| ZnO | 2 |
| S | 2 |
| TBBS | 2 |

DPG Mixes

Four mixes ($C_3$, $C_4$, $E_3$, $E_4$) were prepared comprising curing activators (c) and (e) according to the present invention respectively. As shown below, curing activators (c) and (e) were tested in both the presence and absence of fatty acids.

To accurately assess the advantages of mixes comprising the curing activators according to the present invention, a control mix ($MC_{DPG}$) was prepared comprising no curing activators, and only comprising DPG and fatty acids as activators.

Table III shows the compositions in phr of mixes $C_3$, $C_4$, $E_3$, $E_4$ and the control mix $MC_{DPG}$.

TABLE III

| | $C_3$ | $C_4$ | $E_3$ | $E_4$ | $MC_{DPG}$ |
|---|---|---|---|---|---|
| S-SBR | | | | | 100 |
| N660 | | | | | 40 |
| FATTY ACIDS | | 1 | | 1 | 1 |
| ZnO | | | | | 2 |
| S | | | | | 1 |
| DPG | | | | | 1 |
| Acc. (c) | 1 | 1 | | | |
| Acc. (e) | | | 1 | 1 | |

Tests

The mixes with the above compositions were test cured at different temperatures. More specifically, the rheometric properties of each mix were tested as per ISO Standard 6502.

Table IV shows the rheometric property results of the TBBS mixes. The curing tests were performed at temperatures of 145° C., 160° C., 175° C. and 195° C. The MH and ML values are expressed in dNM, and T'10 and T'90 in minutes.

TABLE IV

| $MC_{TBBS}$ | $A_1$ | $A_2$ | $B_1$ | $B_2$ | $C_1$ | $C_2$ | $D_1$ | $D_2$ | $E_1$ | $E_2$ |
|---|---|---|---|---|---|---|---|---|---|---|
| 145° C. | | | | | | | | | | |
| 1.81 | 1.36 | 1.4 | 1.76 | 1.66 | 1.64 | 1.48 | 1.38 | 1.28 | 1.29 | 1.18 |
| 22.03 | 17.79 | 14.36 | 17.49 | 12.05 | 17.73 | 15.43 | 19.58 | 16.78 | 18.36 | 14.7 |
| 26.39 | 5.26 | 3.3 | 10.3 | 5.32 | 7.53 | 7.15 | 4.38 | 4.22 | 3.7 | 3.5 |
| 37.64 | 15.18 | 25.23 | 20.53 | 29.32 | 17.9 | 27.52 | 13.46 | 23.12 | 13.36 | 24.1 |
| 160° C. | | | | | | | | | | |
| 1.72 | 1.29 | 0.61 | 1.7 | 1.44 | 1.02 | 0.98 | 1.16 | 1.06 | 1.32 | 1.13 |
| 21.23 | 19.02 | 13.21 | 17.38 | 11.16 | 18.59 | 15.04 | 20.05 | 16.87 | 18.2 | 11.11 |
| 8.79 | 1.68 | 0.9 | 2.36 | 1.7 | 1.61 | 1.56 | 1.96 | 1.92 | 2.86 | 2.59 |
| 14.9 | 7.81 | 10.56 | 6.63 | 10.52 | 5.41 | 9.26 | 6.34 | 11.58 | 8.12 | 10.12 |
| 175° C. | | | | | | | | | | |
| 1.53 | 1.12 | 0.74 | 1.53 | 0.98 | 0.86 | 0.8 | 1 | 0.93 | 1.2 | 0.95 |
| 21.24 | 19.65 | 13.12 | 17.39 | 12.62 | 18.63 | 15.96 | 20.32 | 17.57 | 18.36 | 12.44 |
| 3.23 | 0.75 | 0.49 | 1.01 | 0.77 | 0.77 | 0.76 | 0.96 | 0.94 | 1.22 | 1.09 |
| 7.09 | 5.02 | 5.22 | 2.68 | 5.33 | 2.63 | 5.18 | 3.39 | 4.99 | 3.92 | 5.91 |
| 195° C. | | | | | | | | | | |
| 1.34 | 0.55 | 0.74 | 1.29 | 1.03 | 0.79 | 0.78 | 0.92 | 0.84 | 1.13 | 0.88 |
| 20.77 | 19.12 | 14.52 | 17.42 | 12.34 | 18.22 | 15.46 | 20.14 | 17.16 | 18.18 | 13 |
| 0.94 | 0.27 | 0.24 | 0.46 | 0.4 | 0.38 | 0.39 | 0.46 | 0.45 | 0.51 | 0.47 |
| 2.28 | 1.27 | 1.27 | 1.29 | 2.9 | 1.08 | 2.45 | 1.42 | 2.43 | 1.53 | 3.38 |

Table V shows the rheometric property results of the DPG mixes. The curing tests were performed at a temperature of 160° C.

Because curing did not occur at the set conditions, Table V does not show the results of the control mix $MC_{DPG}$.

TABLE V

| | $C_3$ | $C_4$ | $E_3$ | $E_4$ |
|---|---|---|---|---|
| ML | 1.54 | 1.05 | 1.89 | 1.64 |
| MH | 12.31 | 13.58 | 15.14 | 14.2 |
| T10 | 1.91 | 2.89 | 1.83 | 1.51 |
| T50 | 4.84 | 10.17 | 4.49 | 4.7 |
| T90 | 13.92 | 20.04 | 12.42 | 16.61 |

As the above results clearly show, the curing activators according to the present invention provide for a surprisingly significant increase in the effectiveness of the accelerating agents used with them. This constitutes a major advantage in terms of production, as well as a valid alternative to booster accelerating agents widely used in the rubber industry, and some of which are currently under investigation by health protection agencies.

The curing activators according to the present invention also surprisingly provide for limiting use of fatty acids in the mix as activators, which has the advantage of solving the green-rubber adhesion problems posed by salts migrating towards the surface of the mix. Zinc salts, in fact, are formed as an undesired byproduct of fatty acids reacting with zinc oxide.

As will be clear to anyone skilled in the art, the present invention may be used to advantage in industries involving the manufacture of fast-cured rubber products, in particular, and preferably, the tyre industry.

The invention claimed is:

1. A method of curing a mix comprising a cross-linkable unsaturated-chain polymer base comprising the step of activating curing by using a compound of molecular formula (I) as a curing activator;

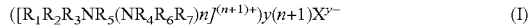  (I)

where:

X is an anionic atom or group $R_1$, $R_2$ and $R_3$, which may be the same or different, are each $C_mH_{2m+1}$, where m ranges between 1 and 3, or $CH_2CHCH_2$ or $CHCHCH_3$ $R_4$, $R_6$ and $R_7$, which may be the same or different, are each $CH_2CHCH_2$ or $CHCHCH_3$ n is 0 or 1 y is 1 when n is 1; y is 1 or 2 when n is 0

$R_5$ is an aliphatic group $C_{15}$-$C_{22}$ when n is 0; and is an aliphatic group $C_8$-$C_{16}$ when n is 1 when n is 0, at least one of $R_1$, $R_2$, $R_3$ and $R_5$ comprises a double bond.

2. The method of claim 1, wherein $R_1$, $R_2$ and $R_3$ are $CH_2CHCH_2$.

3. The method of claim 2, wherein n is 1 and $R_5$ is a saturated aliphatic group.

4. The method of claim 1, wherein $R_5$ comprises a double bond and n is 0.

5. The method of claim 1, wherein said compounds of molecular formula (I) has a molecular formula selected from the group consisting of:

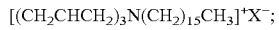

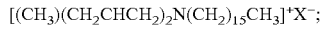

; e and

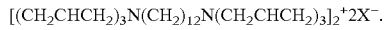

6. The method of claim 1, wherein $X^-$ is $I^-$ or $Br^-$.

7. The method of claim 1, wherein the mix comprising a cross-linkable unsaturated-chain polymer base comprises sulphur and an accelerating agent.

\* \* \* \* \*